(12) United States Patent
Min et al.

(10) Patent No.: US 8,928,209 B2
(45) Date of Patent: Jan. 6, 2015

(54) MOTOR AND METHOD OF MANUFACTURING THE SAME

(75) Inventors: Byung Sung Min, Seoul (KR); Jong Hoon Lee, Incheon (KR)

(73) Assignee: Samhongsa Co., Ltd. (KR)

( * ) Notice: Subject to any disclaimer, the term of this patent is extended or adjusted under 35 U.S.C. 154(b) by 583 days.

(21) Appl. No.: 13/162,961

(22) Filed: Jun. 17, 2011

(65) Prior Publication Data
US 2011/0309724 A1 Dec. 22, 2011

(30) Foreign Application Priority Data

Jun. 18, 2010 (KR) .................. 10-2010-0058073
Nov. 10, 2010 (KR) .................. 10-2010-0111375

(51) Int. Cl.
*H02K 5/167* (2006.01)
*H02K 11/00* (2006.01)
*G11B 19/20* (2006.01)
*H02K 1/18* (2006.01)

(52) U.S. Cl.
CPC ........ *H02K 11/0073* (2013.01); *G11B 19/2009* (2013.01); *H02K 1/187* (2013.01); *H02K 2203/03* (2013.01)
USPC ............................................. 310/425; 310/90

(58) Field of Classification Search
USPC ........ 310/90, 419, 420, 423, 425, 426, 12.31; 384/100, 107
See application file for complete search history.

(56) References Cited

U.S. PATENT DOCUMENTS

| | | | |
|---|---|---|---|
| 6,339,275 B1 * | 1/2002 | Katagiri | 310/424 |
| 6,580,190 B2 * | 6/2003 | Takasu | 310/154.28 |
| 7,638,912 B2 * | 12/2009 | Nishikata et al. | 310/90 |
| 8,143,761 B2 * | 3/2012 | Hong | 310/216.113 |
| 8,148,862 B2 * | 4/2012 | Shirai et al. | 310/90 |
| 2001/0024069 A1 * | 9/2001 | Yamaguchi | 310/67 R |
| 2002/0047396 A1 * | 4/2002 | Saichi et al. | 310/90 |
| 2003/0218397 A1 * | 11/2003 | Takehana et al. | 310/90.5 |
| 2005/0116564 A1 * | 6/2005 | Tokunaga et al. | 310/90 |
| 2005/0140233 A1 * | 6/2005 | Kojima et al. | 310/156.37 |
| 2007/0013255 A1 * | 1/2007 | Wakitani et al. | 310/216 |
| 2007/0216239 A1 * | 9/2007 | Horng et al. | 310/67 R |
| 2008/0169709 A1 * | 7/2008 | Lee | 310/42 |
| 2009/0001835 A1 * | 1/2009 | Kojima et al. | 310/156.01 |
| 2009/0021087 A1 * | 1/2009 | Kitamura et al. | 310/43 |

(Continued)

FOREIGN PATENT DOCUMENTS

| KR | 10-2007-0007517 | 1/2007 |
|---|---|---|
| KR | 10-2007-0036350 | 4/2007 |
| KR | 10-2010-0026807 | 3/2010 |
| KR | 10-2010-0043525 | 4/2010 |

*Primary Examiner* — Quyen Leung
*Assistant Examiner* — Naishadh Desai
(74) *Attorney, Agent, or Firm* — Cantor Colburn LLP

(57) ABSTRACT

Disclosed are a spindle motor and a method of manufacturing the same. A base plate is integrated with a bearing housing using an insert molding or insert injection method at the same time when the bearing housing is made of resin, thereby being capable of securing the verticality of a bearing and a pivot assembled with the bearing housing and the base plate, reducing the manufacturing cost, and improving the efficiency of a manufacturing process. The motor includes a rotor, a pivot configured to have one end connected to the rotor, a bearing configured to rotatably support the outer circumferential face of the pivot, and a bearing housing made of resin and configured to comprise a first concave groove for receiving the bearing and a second concave groove for supporting the other end of the pivot.

8 Claims, 13 Drawing Sheets

(56) References Cited

U.S. PATENT DOCUMENTS

| | | | |
|---|---|---|---|
| 2010/0148607 A1* | 6/2010 | Shirai et al. | 310/90 |
| 2010/0148608 A1* | 6/2010 | Kim et al. | 310/90 |
| 2010/0194250 A1* | 8/2010 | Jung | 310/425 |
| 2011/0047560 A1* | 2/2011 | Hidaka et al. | 720/695 |
| 2011/0309713 A1* | 12/2011 | Jung | 310/216.113 |
| 2011/0317307 A1* | 12/2011 | Yu | 360/75 |

* cited by examiner

MOTOR AND METHOD OF MANUFACTURING THE SAME

CROSS-REFERENCE TO RELATED APPLICATION

Priorities to Korean patent application numbers 10-2010-0058073 filed on Jun. 18, 2010 and 10-2010-0111375 filed on Nov. 10, 2010, the entire disclosure of which is incorporated by reference herein, is claimed.

BACKGROUND OF THE INVENTION

1. Field of the Invention

The present invention relates to a motor and a method of manufacturing the same and, more particularly, to a motor in which a bearing housing is made of resin and, at the same time when the bearing housing is made of resin, a base plate is integrated with the bearing housing a method, such as insert injection, heat fusion, or bonding, thereby being capable of securing the verticality of a bearing and a pivot assembled with the bearing housing and the base plate, reducing the manufacturing cost, improving the efficiency of a manufacturing process, and particularly applicable to a spindle motor for high-speed rotation, and a method of manufacturing the motor.

2. Background of the Related Art

In general, optical disc players, such as an LDP, a CDP, a CD-ROM player, a DVD-ROM player, a DVD player, a BD, and a 3D player, are devices each configured to have a mounting hole, formed to penetrate the center of a disc, to a turntable using a chuck (that is, a clamping unit), while loading the disc on the turntable according to a loading mechanism, and to play information recorded on the disc, clamped to the chuck in one direction, using an optical pickup unit moving in a radius direction thereof while rotating the disc using the driving source of a spindle motor (that is, driving means).

In general, the spindle motor can maintain a rotation characteristic of high accuracy by rotatably supporting a pivot so that a predetermined contact interval is maintained between bearing and a pivot. Accordingly, the spindle motor is being widely used as a hard disc drive (HDD), an optical disc drive (ODD), and means for driving a recording medium requiring high-speed rotation.

It is required the spindle motor requiring high-speed rotation become thin and be reduced in weight in accordance with the development of electronic devices gradually reduced in size. An example of the spindle motor is schematically shown in FIG. 1 (refer to Korean Patent Laid-Open Publication No. 10-2010-0043525)

FIG. 1 is a cross-sectional view of a conventional spindle motor in the axial direction. As shown, the conventional spindle motor is configured to have an outer circumferential face on the bottom end side of a bearing housing 13 inserted into a connection hole formed in a base plate 11 so that external protrusions 13a are coupled through spinning or caulking. A stopper 14 and a cap 15 are connected to an inner circumferential face on the bottom end side of the bearing housing 13 and configured to prevent the pivot 19 from being separated from the inner circumferential face. The cap 15 is connected to the internal protrusion 13b on the bottom end side of the bearing housing 13 through spinning or caulking.

A bearing 17 is fixed within the bearing housing 13. A pivot 19 is supported by and rotatably installed in the bearing 17. A support washer 16 for reducing the rotation resistance of the pivot is disposed within the cap 15 at the bottom of the pivot 19.

Furthermore, a stator 21, including a core 21a and a coil 21b, is fixed to the outer circumferential face of the bearing housing 13. A rotor 23, including a rotor yoke 23a and a magnet 23b, is fixed to the front end portion of the pivot 19.

The top surface of the rotor yoke 23a of the rotor 23 functions as a turntable for fixing and seating a disc D, having data stored therein, thereto and therein. To this end, a rubber ring 12 for preventing the disc D from being slit is disposed on the rotor yoke 23a. A chucking device 18, including a disc chucks 18b and a chuck casing 18a, is provided on the inner side on the top of the rotor yoke 23a and configured to fix the disc D loaded on the turntable.

In the conventional spindle motor, when current is supplied to the coil 21b, a rotary magnetic field is generated, and the disc D mounted on the rotor yoke 23a is rotated by the magnet 23b (that is, the rotor 23) which is rotated by electromagnetic force formed between the coil 21b and the magnet 23b.

The conventional spindle motor is disadvantageous in that an assembly process is complicated because the connection of the bearing housing 13 and the base plate 11 and the connection of the bearing housing 13 and the cap 15 are performed by a process of spinning or caulking the outside and inside protrusions 13a and 13b.

Furthermore, in the prior art, when the spinning or caulking process is performed in order to couple and fix the bearing housing 13 and the base plate 11 and the bearing housing 13 and the cap 15, the verticality of the bearing housing 13 to the base plate 11 is frequently deviated. Consequently, when the bearing 17 is pressed to the bearing housing 13, repair is required because the verticality and the run-out problem of the bearing 17 are generated. In this case, if the pivot 19 is assembled with the bearing 17 without repair, there is an advantage in that vibration and noise are generated because the pivot 19 is inclined from the base plate 11.

When the bearing 17 is pressed to the bearing housing 13, the outer diameter portion of the bearing 17 is changed owing to the pressing. Accordingly, the outer diameter portion of the bearing needs to be processed using a sizing process of correcting the change.

Furthermore, if the spinning or caulking process for connecting the cap 15 is bad, there is an advantage in that oil within the bearing 17 leaks through a portion where the bearing housing 13 and the cap 15 come in contact with each other.

In the conventional spindle motor, the bearing housing 13 is made of brass or aluminum material and fabricated by processing or compression processing using a CNC machine. Accordingly, there is an advantage in that the manufacturing cost is high.

In a DVD disc of a half height drive for DVD record, there is a tendency that the disc record speed is increasing so that the DVD disc has the record speed of 16 to 20-speed or higher. In the record speed improvement, a maximum rotation speed of the spindle motor must be 10,500 RPM or higher. If the spindle motor has the high rotational speed, the verticality of the pivot becomes more important in order to prevent vibration and noise.

Furthermore, Korean Patent Laid-Open Publication No. 10-2010-26807 (relating to a spindle motor) proposes the spindle motor capable of preventing the rotation of a bearing holder by forming a burring portion protruding over a plate and forming a connection groove, corresponding to a burring portion, in the bearing holder so that the bearing holder is supported by the connection groove in a circumferential direction, with consideration taken of a problem that the bearing holder is rotated or shaken in relation to the plate by means of external force or rotary power supplied to the bearing holder when the rotor casing and the pivot are rotated.

Meanwhile, Korean Patent Laid-Open Publication No. 10-2007-36350 (relating to a spindle motor for an optical disc drive) proposes a structure in which a shaft holder and a base plate are integrally molded by diecasting or metal-in mold injection and also made of an aluminum alloy or a zinc alloy material having a relatively low specific gravity in order to reduce the weight of the spindle motor for an optical disc driver, thereby reducing the total weight of a mobile communication device.

However, the spindle motor is formed by molding metal material having a relatively low specific gravity in order to reduce weight. A cap for supporting a thrust bearing is separately fabricated and assembled. A spinning process for fixing and connecting the cap and the base plate is required.

Korean Patent Laid-Open Publication No. 10-2007-7517 (relating to a spindle motor) proposes technology in which a bearing housing and a base plate are integrally formed by twice bending the base plate. It is however difficult to secure desired verticality for the bearing housing because it is difficult to mold the base plate in a precise micron order, and axial verticality may be influenced when the stator and the bearing are assembled.

SUMMARY OF THE INVENTION

Accordingly, the present invention has been made in view of the above problems occurring in the prior art, and it is an object of the present invention to provide a motor in which a bearing housing is made of resin and, at the same time when the bearing housing is made of resin, a base plate is integrated with the bearing housing a method, such as insert injection, heat fusion, or bonding, thereby being capable of securing the verticality of a bearing and a pivot assembled with the bearing housing and the base plate, reducing the manufacturing cost, improving the efficiency of a manufacturing process, and particularly applicable to a spindle motor for high-speed rotation, and a method of manufacturing the motor.

It is another object of the present invention to provide a motor and a method of manufacturing the same, which are capable of reducing assembly parts by integrally forming a support washer and a cap using the same material as the support washer when forming a bearing housing, of reducing vibration and noise by improving the verticality of a pivot, and of preventing oil within a bearing from leaking.

It is yet another object of the present invention to provide a spindle motor not requiring a sizing process because there is no change in the outer diameter portion of a bearing because the strength of the bearing is greater than the strength of a bearing housing when the bearing is pressed to and assembled with the bearing housing.

It is further yet another object of the present invention to provide a motor which is capable of constantly fixing a bearing housing to a specific position of a stator using an assembly guides provided in the outer circumferential portion of the bearing housing and of easily performing a work for assembling and fixing the stator by processing the front end portions of fixing protrusions using heat fusion or bonding.

It is further yet another object of the present invention to provide a motor and a method of manufacturing the same, which are capable of improving the assembly of parts, reducing the manufacturing cost, improving the verticality of a pivot, and reducing vibration and noise by molding a fixed body housing in which a base plate is integrally formed with a bearing housing the same material.

It is further yet another object of the present invention to provide a motor which is capable of preventing a skew of a pivot or a bearing, guaranteeing a stabilized driving characteristic, and reducing weight and size by forming a fixed body housing in which a base plate and a bearing housing are integrated.

To achieve the above objects, according to an aspect of the present invention, there is provided a motor, including a rotor; a pivot configured to have one end connected to the rotor; a bearing configured to rotatably support the outer circumferential face of the pivot; and a bearing housing made of resin and configured to include a first concave groove for receiving the bearing and a second concave groove for supporting the other end of the pivot.

According to another aspect of the present invention, there is provided a motor, comprising a rotor; a pivot configured to have one end connected to the rotor; a bearing configured to rotatably support the outer circumferential face of the pivot; a bearing housing configured to include a first concave groove for receiving the bearing and a second concave groove for supporting the other end of the pivot; and a stator connected to an outer diameter portion of the bearing housing in such a way as to be opposite to the rotor and configured to generate an electromagnetic field when a driving signal is supplied thereto, thereby rotating the rotor. The bearing housing has the outer diameter portion, connected to the stator, extended therefrom and has a front end portion compress and fix the top surface of the stator.

According to yet another aspect of the present invention, there is provided a method of manufacturing a motor, comprising the steps of forming a bearing housing, including a first concave groove configured to receive a bearing and a second concave groove formed in the central portion of the first concave groove, by using resin through injection and molding; sequentially assembling a slit washer and the bearing to the first concave groove of the bearing housing; coupling the stator to the outer circumferential portion of the bearing housing; compressing and fixing a front end portion, extended from the outer diameter portion of the bearing housing, to the top surface of the stator; and assembling a pivot of a rotor to the bearing.

DETAILED DESCRIPTION OF EMBODIMENTS

Figure 1:
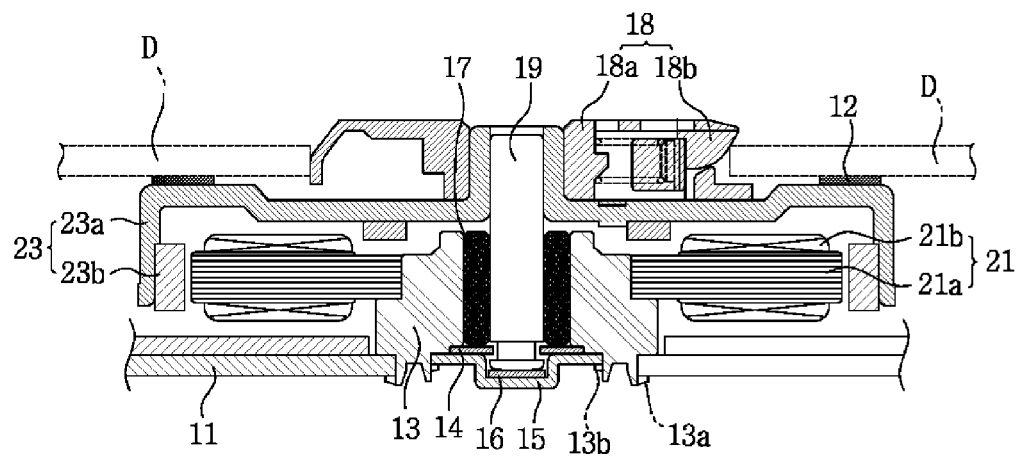
FIG. 1 is a cross-sectional view of a conventional spindle motor in the axial direction.
Figure 2:
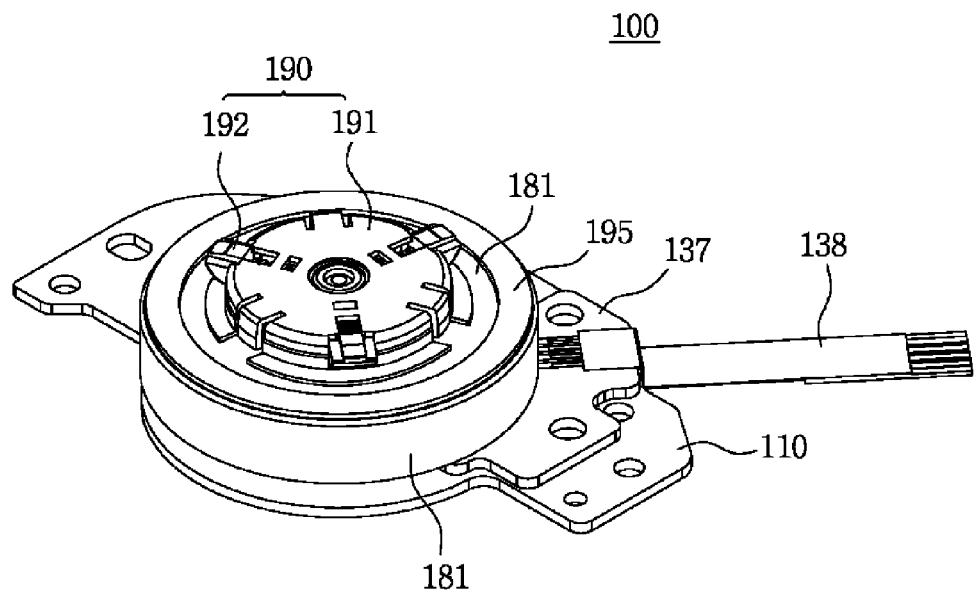
FIG. 2 is a perspective view showing an ultra-thin type spindle motor according to a first embodiment of the present invention.

Spindle motors according to preferred embodiments of the present invention will now be described in detail with reference to the accompanying drawings.

First, the present invention can be applied to not only a spindle motor requiring high-speed rotation, but also a motor for low-speed rotation and can also be applied to a brushless DC motor or a DC motor.

In a description of the embodiments hereinafter given with reference to the drawings, an example in which a BLDC type spindle motor is applied as a preferred embodiment of the present invention is described.

FIGS. 2 to 6 are a perspective view, a bottom view, a cross-sectional view, an exploded perspective view, and a perspective view showing an ultra-thin type spindle motor according to a first embodiment of the present invention.

Referring to FIGS. 2 to 6, the ultra-thin type spindle motor 100 according to the first preferred embodiment of the present invention chiefly includes a stator (or an armature) 140 and a rotor 180 of an outer rotor method.

First, the stator 140 includes a core 141 configured to have a plurality of teeth 144 protruded in a radial direction from the body of a ring shape, a bobbin 142 made of insulating material in each of the teeth, and a coil 143 wound on the outside of the bobbin 142.

The rotor 180 includes a rotor casing 181 formed in a reversed cup shape and a ring-shaped magnet 182 configured to have a plurality of N pole and S pole magnets alternately disposed or the N poles and the S poles divided and magnetized thereon. In this case, it is preferred that the rotor casing 181 be made of a magnetic path-forming material which can prevent the rotor 180 from rising and fluctuating in the axial direction when the rotor 180 is rotated, by means of a back yoke role against the magnet 182 and a mutual attraction action due to magnetic force along with a rotor separation-prevention tool 170 including a thrust magnet 171 and a yoke 172.

However, the rotor casing 181 may also be made of non-magnetic material, such as aluminum (Al), in order to reduce weight in addition to the magnetic path-forming material. A ring-shaped ring made of a magnetic path-forming material may also be provided on the bottom surface of the rotor casing 181 opposite to the rotor separation-prevention tool 170 in order to prevent the rotor from being separated therefrom.

The rotor casing 181 is equipped with a circular cover plate 181b, a downward bent portion 181c, and an upward bent portion 181a. The circular cover plate 181b functions as a turntable for fixing and seating a disc D for storing data (that is, a recording medium) thereto and therein. The downward bent portion 181c is downwardly bent from the front end portion of the cover plate so that it is opposite to the outer circumferential portion of the stator 140 and configured to have the magnet 182 attached to the inner circumferential face thereof. The upward bent portion 181a is upwardly protruded so that a pivot 150 can be stably connected to the central portion of the cover plate.

A disc support unit 195 is disposed outside the circular cover plate 181b and formed of a rubber ring in order to prevent the slit of the disc D. A chucking device 190 is disposed inside the circular cover plate 181b. The chucking device 190 includes three disc chucks 192 configured to have their front end portions resiliently supported by respective springs 193 in order to fix the loaded disc D and a circular chuck casing 191 configured to support the chucks. The chuck casing 191 has a central portion connected to and supported by the upward bent portion 181a of the rotor casing 181.

In the spindle motor 100 constructed as above, when current is supplied to the coil 143, a rotational magnetic field is generated, and the disc D mounted on the rotor casing 181 is rotated by the rotation of the magnet 182 (that is, the rotor 189) due to magnetic force formed between the coil 143 and the magnet 182.

Meanwhile, the spindle motor 100 of the present invention may be divided into a rotating body 101, including the rotor 180 and the chucking device 190 and having a central portion connected to the pivot 150, and a fixed body 103 rotatably supporting the pivot 150 connected to the center of the rotating body 101.

The fixed body 103 includes a bearing housing 120. The bearing housing has the stator 140 connected to an upper outer circumferential portion thereof, has a base plate (or a bracket) 110 integrally connected to and formed in a lower outer circumferential portion thereof, and has a bearing 160 connected to a first concave groove 121 formed in an inner circumferential portion thereof. The rotating body 101 has the pivot 150 connected to the center thereof and rotatably supported by the bearing 160.

The base plate 110 generally fixes and supports the fixed body 103. For example, the base plate 110 may be fabricated in various forms so that it can be fixed a variety of disc drive devices each having the spindle motor 100 installed therein. The base plate 110 is equipped with a plurality of screws or bolt fastening holes 115.

Furthermore, the base plate 110 further includes at least one fixing hole 119 for fixing a PCB 137 thereto using a method, such as caulking. The PCB 137 is disposed under the stator 140 and configured to supply a driving signal to the stator 140. The driving signal for controlling the spindle motor 100 is supplied from the main body of the disc drive device to the PCB 137 through, for example, a Flexible Flat Cable (FFC) 138.

It is preferred that the base plate 110 be chiefly made of light-weight material, such as aluminum (Al) or an aluminum alloy, or an iron-based alloy. However, the base plate 110 may be made of other metal material or synthetic resin.

Figure 7:
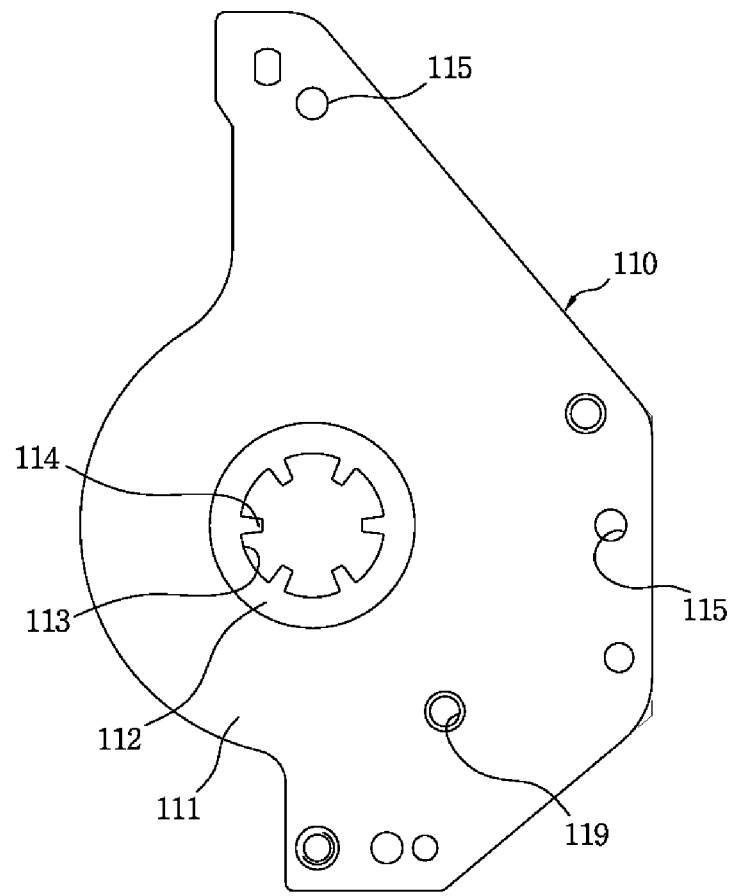
FIGS. 7 and 8 are a plan view and a cross-sectional view of a base plate used in the ultra-thin type spindle motor according to the first embodiment of the present invention.
Figure 8:
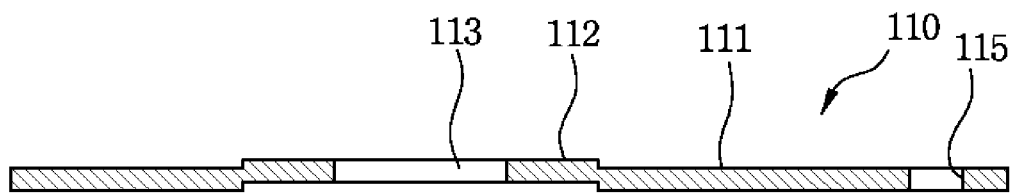

In this case, the base plate 110 may be integrated with the bearing housing 120 using an insert injection or insert molding method, when the bearing housing 120 subjected to injection molding using thermoplastic or thermosetting resin is fabricated, as shown in FIGS. 7 and 8.

To this end, the base plate 110 includes a flat plate portion 111 and an extension portion 112 which is upwardly bent from the flat plate portion 111 and extended and molded in parallel to the flat plate portion 111 in order to increase coherence with the bearing housing 120, as shown in FIGS. 7 and 8. The extension portion 112 includes a number of, for example, six protrusion portions 114. The protrusion portions 114 are protruded toward a through hole 113 formed at the center of the extension portion 112.

Figure 4:
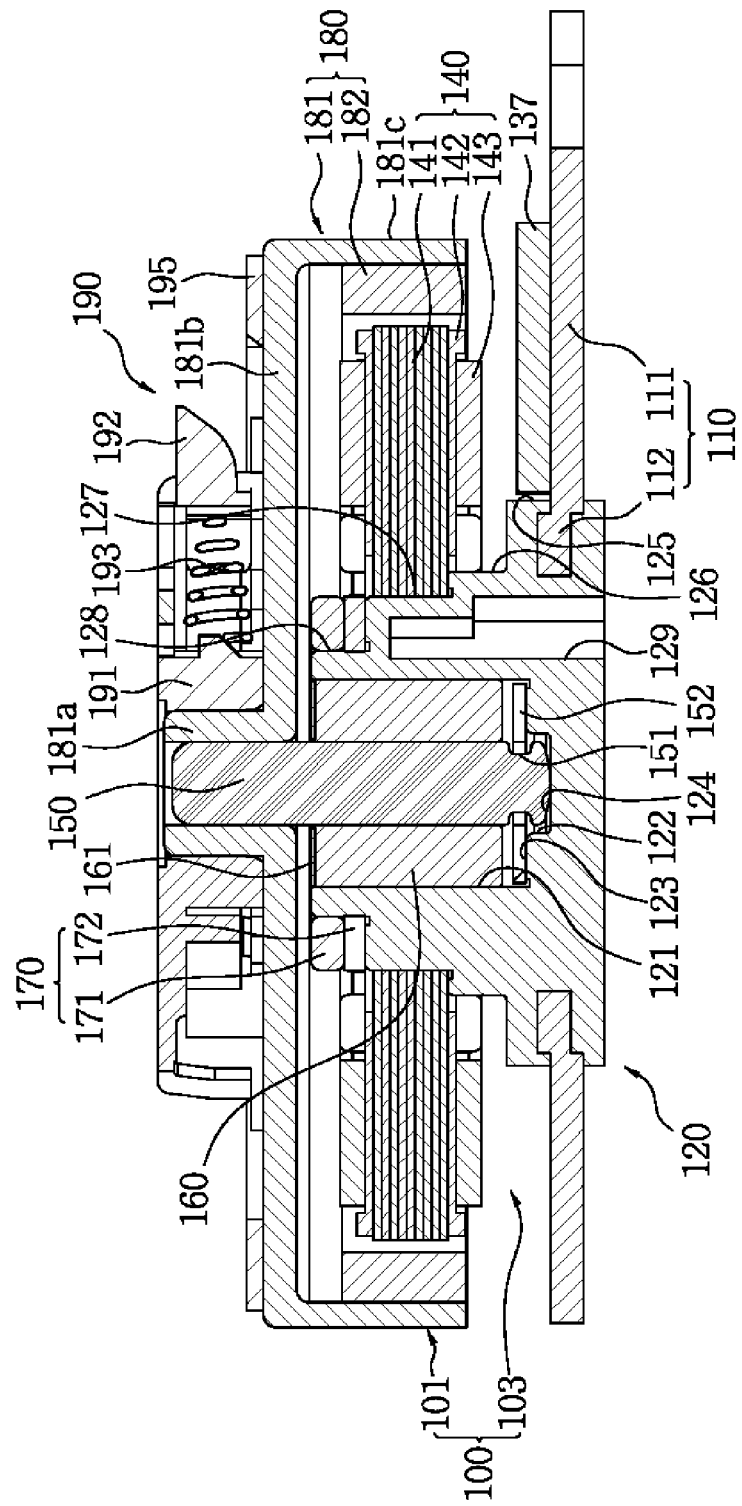
FIG. 4 is a cross-sectional view of the ultra-thin type spindle motor in the axial direction according to the first embodiment of the present invention.
Figure 5:
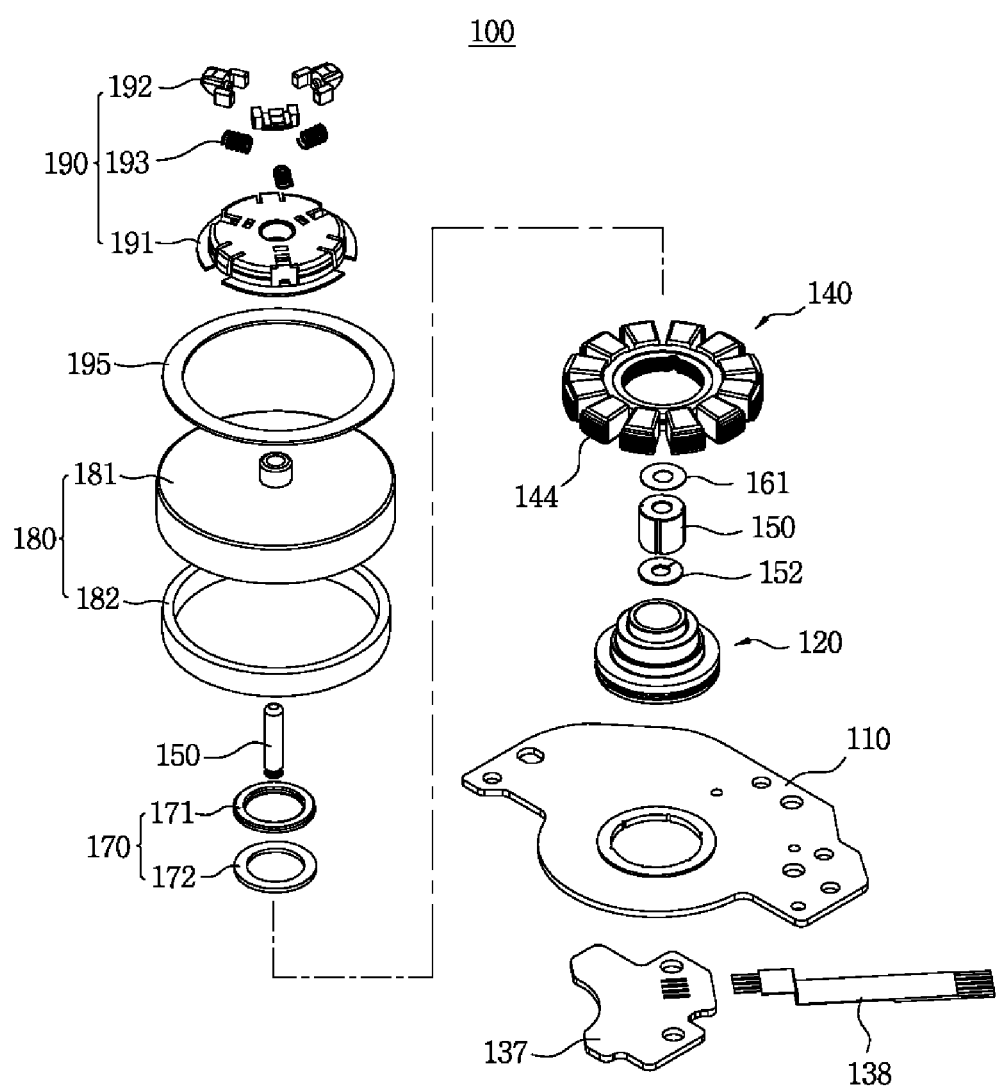
FIG. 5 is an exploded perspective view of the ultra-thin type spindle motor according to the first embodiment of the present invention.
Figure 6:
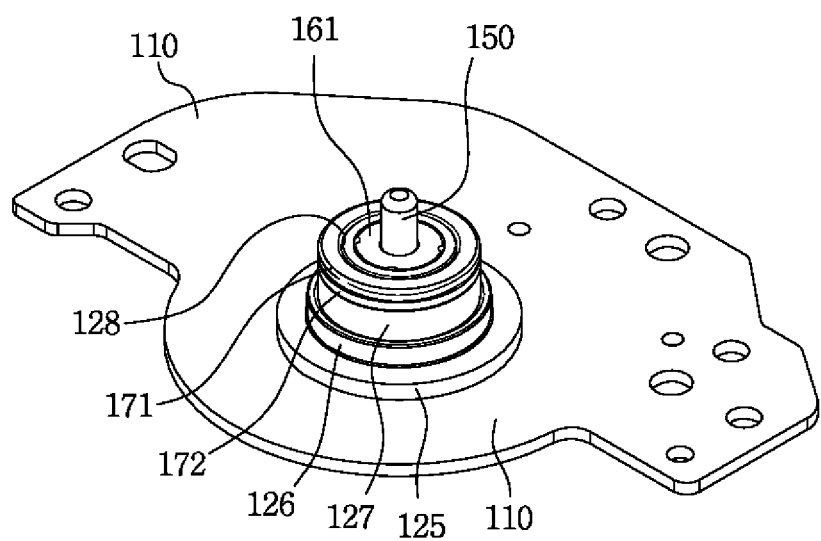
FIG. 6 is a perspective view of a partial assembly body showing a state in which a stator and a rotor are removed from the ultra-thin type spindle motor according to the first embodiment of the present invention.

Part of an inner portion of the base plate 110 is buried in the first outer diameter portion 125 placed at the bottom of an outer circumferential portion of the bearing housing 120 by means of an insert injection or insert molding method when the bearing housing 120 is injected and molded and is thus integrated with the bearing housing 120, as shown in FIGS. 4 to 6.

The bearing housing 120 further includes second to fourth outer diameter portions 126 to 128 which are sequentially reduced in size from the first outer diameter portion 125 step by step. The inner circumferential portion of the stator 140 is connected to the outer circumference of the third outer diameter portion 127 and then seated in a step portion between the second outer diameter portion 126 and the third outer diameter portion 127. A ring-shaped thrust magnet (absorption magnet) 171 for suppressing the rotor 180 from rising in the axial direction when the rotor 180 is rotated at high speed and a yoke 172 for fixing the thrust magnet 171 and preventing the loss of magnetism of the thrust magnet 171 are sequentially connected to the outer circumference of the fourth outer diameter portion 128 and then seated in a step portion between the third outer diameter portion 127 and the fourth outer diameter portion 128.

The yoke 172 precludes magnetic flux of the thrust magnet 171 from flowing into the core 141 of the stator so that the magnetic flux of the thrust magnet 171 can prevent a magnetic circuit, formed of the stator 140 and the rotor the magnet 182, from being influenced and deterrent power for suppressing the rotor 180 from rising when the rotor 180 is rotated at high speed can also be improved.

The bearing 160 is connected to the first concave groove 121 of a cylindrical shape, formed on the inner circumferential portion of the bearing housing 120. The bearing 160 has a circular through hole formed at a central portion thereof and has the pivot 150 rotatably coupled thereto. In this case, the bottom of the pivot 150 is inserted into a second concave groove 122 of a second diameter, formed in the central portion of the first concave groove 121 and supported by the bottom surface 124 of the second concave groove 122. Furthermore, a slit washer 152 is disposed on the bottom surface 123 of the first concave groove 121 and inserted into a concave groove portion 151 on the lower side of the pivot 150. The slit washer 152 suppresses the pivot 150 of the rotor 180 from being separated from the bearing 160.

An oilless bearing made of, for example, oil-containing sintered metal, may be used as the bearing 160. The bearing 160 has a cylinder form. That is, a metal bearing in which oil has been penetrated into a porous copper alloy (brass series) may be used as the bearing 160.

An oil scattering-prevention washer 161 for preventing the oil within the bearing from being scattered is connected to the entrance of the first concave groove 121 of the bearing housing 120 over the bearing 160.

The bearing housing 120 may be made of thermosetting resin or thermoplastic resin, such as engineering plastic material such as nylon 66 or polycarbonate (PC), according to an injection and molding method.

Figure 3:
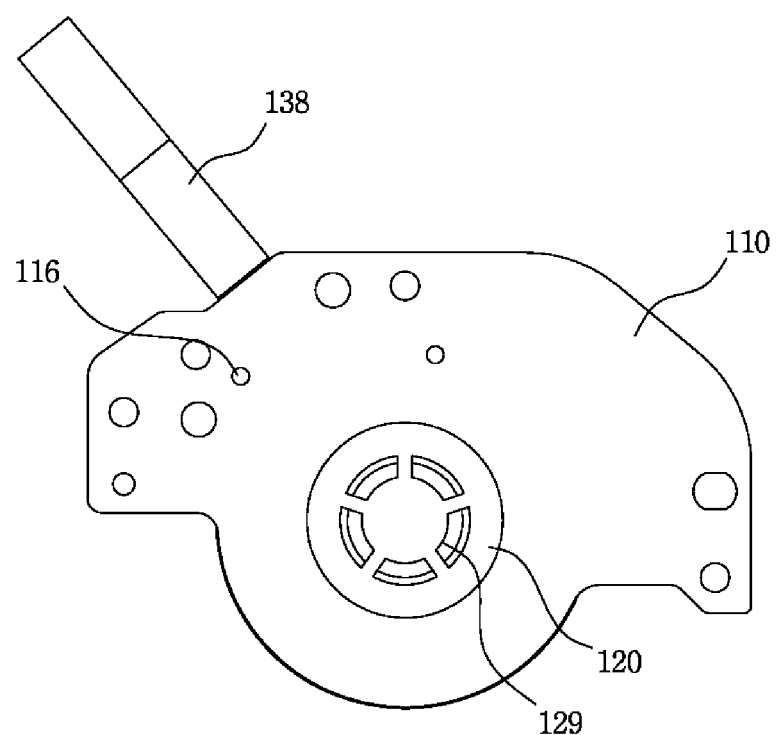
FIG. 3 is a bottom view showing the ultra-thin type spindle motor according to the first embodiment of the present invention.

In this case, it is preferred that the bearing housing 120 form at least one lose-weight space 129 in order to reduce the cost of materials and reduce weight at the same time, as shown in FIGS. 3 and 4. The lose-weight space 129 may have a number of, for example, five arc shapes, as shown in FIG. 3. In this case, a cylindrical bearing housing portion, substantially surrounding the bearing 160 in the bearing housing 120, and a portion between the stator 140 and the base plate 110 can have strength enough to support the bearing 160, the stator 140, and the base plate 110 although the lose-weight space 129 is formed.

Furthermore, in the case where the bearing housing 120 is molded using material, such as engineering plastic such as nylon 66 or polycarbonate (PC) used as material for a support washer or a thrust plate, the support washer or the thrust plate may be omitted in order to reduce friction resistance of the pivot 150 as in the prior art. In this case, the material used for injection and molding may include plastic material having the same hardness as or higher hardness than the material conventionally used for the support washer or the thrust plate and may include any material that can be injected and molded.

In the present invention, the bearing housing 120 is integrally formed with a cap supporting the support washer or the thrust plate, thereby being capable of further reducing the number of parts.

A method of assembling the spindle motor 100 constructed as above according to the present invention is described below.

First, the bearing housing 120 is molded using the insert injection or insert molding method and, at the same time, the base plate 110 is molded so that part of an inner portion thereof is buried in the bearing housing 120, thereby integrating the bearing housing 120 and the base plate 110.

Next, the PCB 137 for supplying a driving signal to the stator 140 is fixed to the base plate 110, disposed under the stator 140, using a method, such as caulking.

Next, the slit washer 152 and the bearing 160 are sequentially inserted into the first concave groove 121 of the bearing housing 120. When the bearing 160 is inserted into the bearing housing 120 and fixed thereto, the bearing 160 may be fixed to the bearing housing 120 using pressing or a method, such as fixing or fusion using adhesives.

Next, the stator 140 assembled in advance is pressed and connected to the outer circumference of the third outer diameter portion 127 so that the stator 140 is seated in the step portion between the second outer diameter portion 126 and the third outer diameter portion 127 of the bearing housing 120 and then fixed using adhesives.

Furthermore, the yoke 172 of a ring shape is connected to the outer circumference of the fourth outer diameter portion 128 so that the yoke 172 is seated in the step portion between the third outer diameter portion 127 and the fourth outer diameter portion 128 and then fixed using adhesives. Next, the thrust magnet 171 is stacked on the yoke 172 and then fixed using adhesives.

In this case, in order to make slim the height of the fixed body 103, the rotor separation-prevention tool 170, consisting of the thrust magnet 171 and the yoke 172, may not be seated in the step portion between the third outer diameter portion 127 and the fourth outer diameter portion 128, but may be disposed over the stator 140 so that the rotor separation-prevention tool 170 faces the cover plate 181b of the rotor casing 181 functioning as a back yoke, or the thrust magnet 171 may be disposed at the bottom surface of the cover plate 181b of the rotor casing 181 opposite to the core 141 of the stator 140.

Next, the chucking device 190 and the disc support unit 195 are connected to the top of the circular cover plate 181b of the rotor 180 assembled in advance, and one end of the pivot 150 is pressed and connected to the upward bent portion 181a of the rotor casing 181, thereby completing the rotating body 101.

Next, the other end of the pivot 150 is inserted into the hollow portion of the bearing 160 and then coupled thereto until the bottom end of the pivot 150 passes through the slit washer 152 and then comes in contact with the bottom surface 124 of the second concave groove 122 of the bearing housing 120. Accordingly, the assembly is completed.

In the spindle motor 100 according to the first embodiment of the present invention, the bearing housing 120 is formed using resin and, at the same time, part of the base plate 110 is integrated with the bearing housing 120 using an insert molding or insert injection method, thereby being capable of sufficiently securing the verticality of the bearing 160 and the pivot 150 assembled with the bearing housing 120 and the base plate 110. Accordingly, the present invention can reduce the manufacturing cost and improve the efficiency of an assembly process because a conventional spinning or caulking process for connecting the bearing housing 120 and the base plate 110 can be omitted.

Furthermore, in the present invention, when the bearing housing 120 is formed, the support washer and the cap are integrally formed using the same material as the support washer. Accordingly, the number of assembly parts can be reduced, vibration and noise can be reduced because the verticality of the pivot 150 is improved, and the leakage of oil within the bearing 160 due to defective assembly can be fundamentally prevented.

Furthermore, in the present invention, when the bearing 160 is pressed and assembled with the bearing housing 120, there is no change in the outer diameter portion of the bearing because the strength of the bearing 160 made of metal material is greater than the strength of the bearing housing 120 made of resin. Accordingly, a sizing process is not required.

A spindle motor 100a according to a second embodiment of the present invention is described below with reference to FIG. 9.

In the spindle motor 100 according to the first embodiment of the present invention, when the stator 140 is assembled with the bearing housing 120, the stator 140 is pressed and connected to the outer circumference of the third outer diameter portion 127 and then fixed using adhesives. Furthermore, the yoke 172 of a ring shape is connected to the outer circumference of the fourth outer diameter portion 128 and then fixed using adhesives.

In the spindle motor 100a according to the second embodiment, a plurality of fixing protrusions 127a is formed at specific intervals from a step portion 128a between the third outer diameter portion 127 and the fourth outer diameter portion 128 of the bearing housing 120 to the upper side. A plurality of through holes 172b corresponding to the respective fixing protrusions 127a is formed in the yoke 172 of a ring shape. A plurality of concave grooves 172a is formed over the respective through holes 172b.

Consequently, in the spindle motor 100a according to the second embodiment, when the stator 140 is assembled with the bearing housing 120, the stator 140 is connected to the outer circumference of the third outer diameter portion 127 and the plurality of through holes 172b of the yoke 172 is mated with the plurality of fixing protrusions 127a. Next, when the front end portions of the fixing protrusions 127a upwardly protruded from the through hole 172b are compressed using heat fusion or ultrasonic bonding, the bearing housing 120 and the yoke 172 are fixed together and, at the same time, the stator 140 and the yoke 172 are fixed together.

Next, the thrust magnet 171 is stacked on the yoke 172 and then fixed using adhesives.

Figure 9:
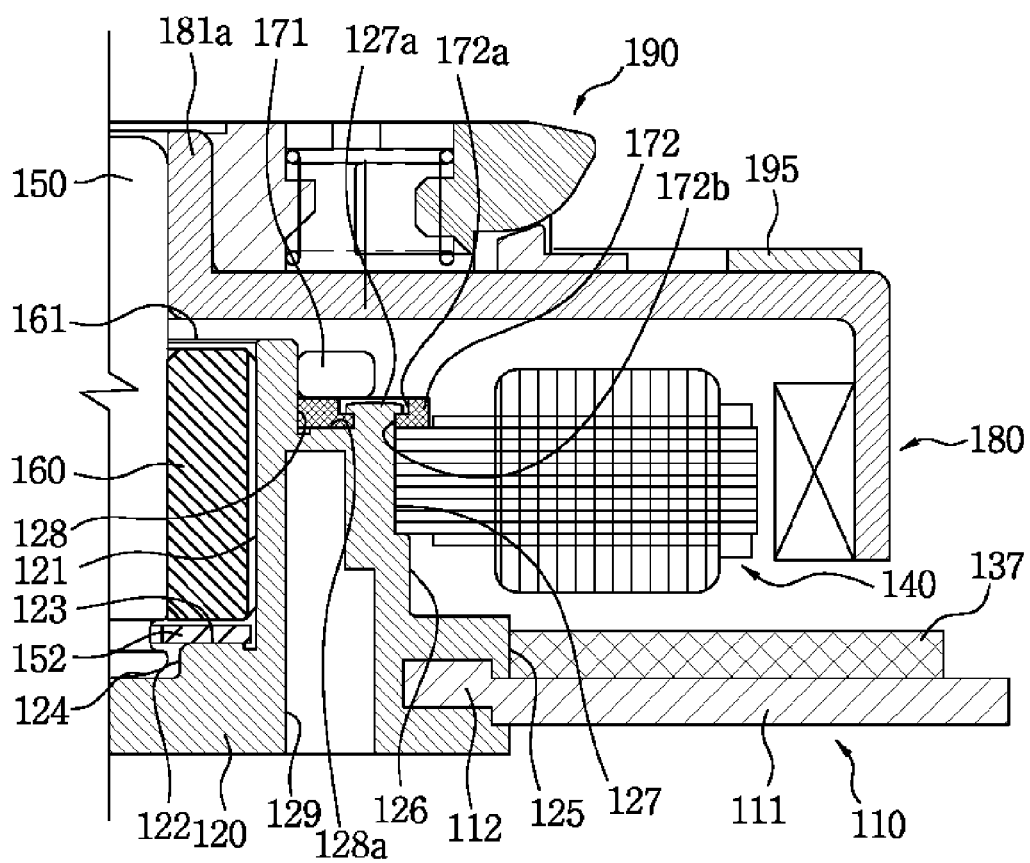
FIG. 9 is a cross-sectional view of an ultra-thin type spindle motor in the axial direction according to a second embodiment of the present invention.

The structures and actions of the remaining parts in the second embodiment shown in FIG. 9 are the same as those in the first embodiment, and a description thereof is omitted. Furthermore, the same parts as those of the first embodiment are assigned the same reference numerals.

Figure 15:
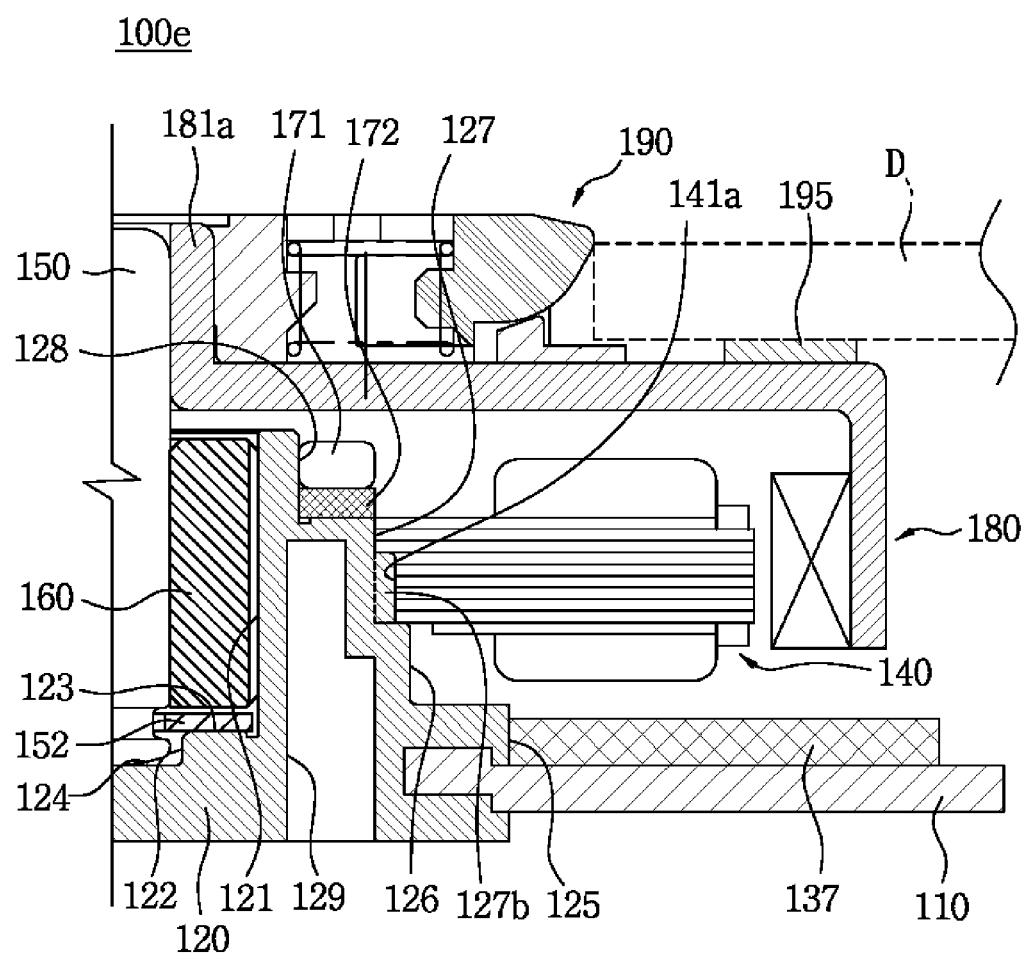
FIG. 15 is a cross-sectional view showing a modification example of an ultra-thin type spindle motor in the axial direction according to a sixth embodiment of the present invention.

Meanwhile, in the spindle motor 100a according to the second embodiment, the assembly structure of the stator 140 may be modified as in a sixth embodiment shown in FIG. 15.

In a spindle motor 100e according to the sixth embodiment shown in FIG. 15, at least one, preferably, four assembly guides 127b are integrally formed at specific intervals on the outer circumference of the third outer diameter portion 127 of the bearing housing 120. A plurality of assembly concave grooves 141a corresponding to the assembly guides 127b is formed on the inner circumference of the stator 140 connected to the assembly concave grooves 141a.

In the spindle motor 100e according to the sixth embodiment, when the stator 140 is fixed to the bearing housing 120, the stator 140 can be assembled with the bearing housing 120 at a constant position using the plurality of assembly guides 127b provided on the outer circumferential portion of the bearing housing 120, and the rotation of the assembled stator 140 can be prevented.

On the other hand, at least one, preferably, a plurality of assembly guides may be provided on the inner circumference of the stator 140, and a plurality of assembly concave grooves corresponding to the plurality of assembly guides may be formed on the outer circumferential portion of the bearing housing 120 in order to prevent the rotation of the assembled stator 140.

As described above, in the spindle motors 100a and 100e according to the second and the sixth embodiments of the present invention, when the stator assembly structures are formed, the assembly position of the stator 140 can be constantly set using the assembly guides 127b provided on the outer circumferential portion of the bearing housing 120 when the stator 140 is fixed to the bearing housing 120 and, at the same time, the assembly and fixing work of the stator 140 can be easily performed by fusing the front end portions of the fixing protrusions 127a using heat without using conventional two-component type adhesives.

A spindle motor 100b according to a third embodiment of the present invention is described below with reference to FIGS. 10 to 12.

In the spindle motor 100 according to the first embodiment of the present invention, when the bearing housing 120 is formed, the lose-weight space 129, together with the base plate 110, is integrally formed with the bearing housing 120 using the insert molding or insert injection method in order to reduce weight, but may be modified as in the third embodiment.

Figure 11:
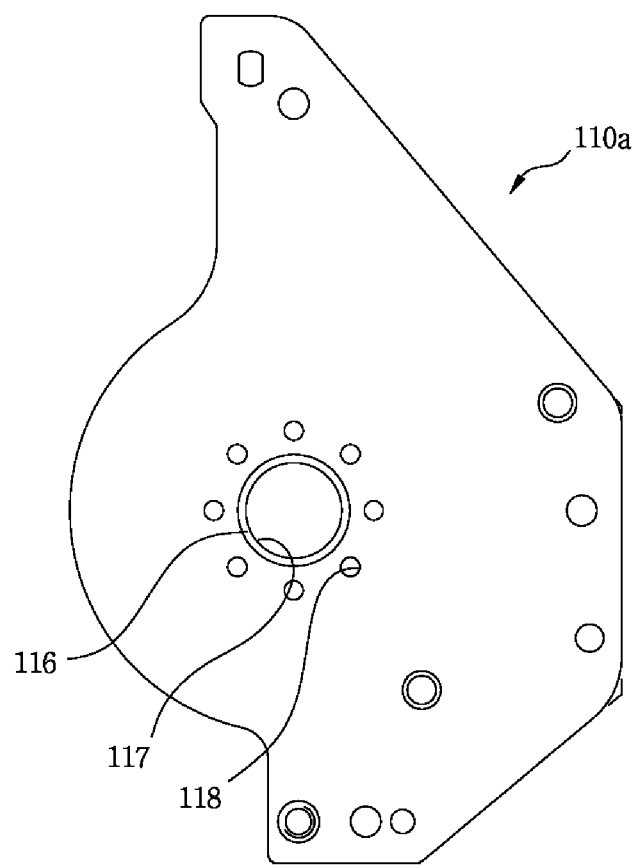
FIGS. 11 and 12 are a plan view and a cross-sectional view of a base plate used in the ultra-thin type spindle motor according to the third embodiment of the present invention.
Figure 12:
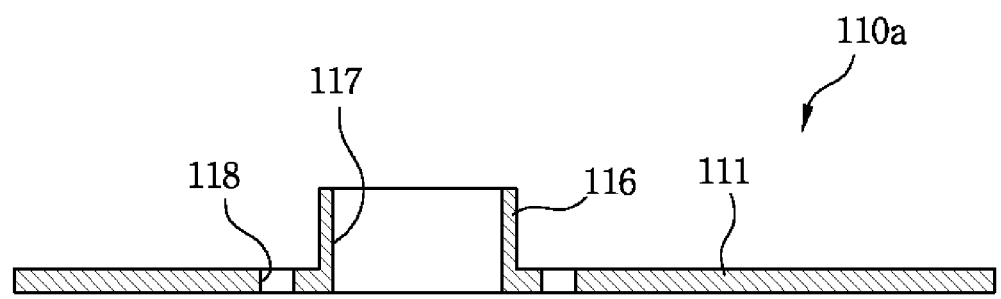

That is, in the spindle motor 100b according to the third embodiment of the present invention, the base plate 110a includes a strength reinforcement extension portion 116 which is bent at a right angle to the through hole 117 and then upwardly extended, as shown in FIGS. 11 and 12.

In this case, if the bearing housing 120, together with the base plate 110a, is subjected to insert injection when the bearing housing 120 is formed, the lose-weight space is omitted, and the strength reinforcement extension portion 116 is disposed in the lose-weight space, the strength of the boss portion surrounding the bearing 160 of the bearing housing 120 is further reinforced. Accordingly, thermal deformation can be prevented, and the verticality of the bearing 160 and the pivot 150 can be secured more accurately.

In order to reinforce with the integration of the base plate 110 with the bearing housing 120, the plurality of through holes 118 may be formed on a concentric circle on the outskirts of the through hole 117 and both the through holes 117 and 118 may be filled with resin using an insert injection method using resin. Accordingly, coherence between the bearing housing 120 and the base plate 110a can be reinforced.

Figure 10:
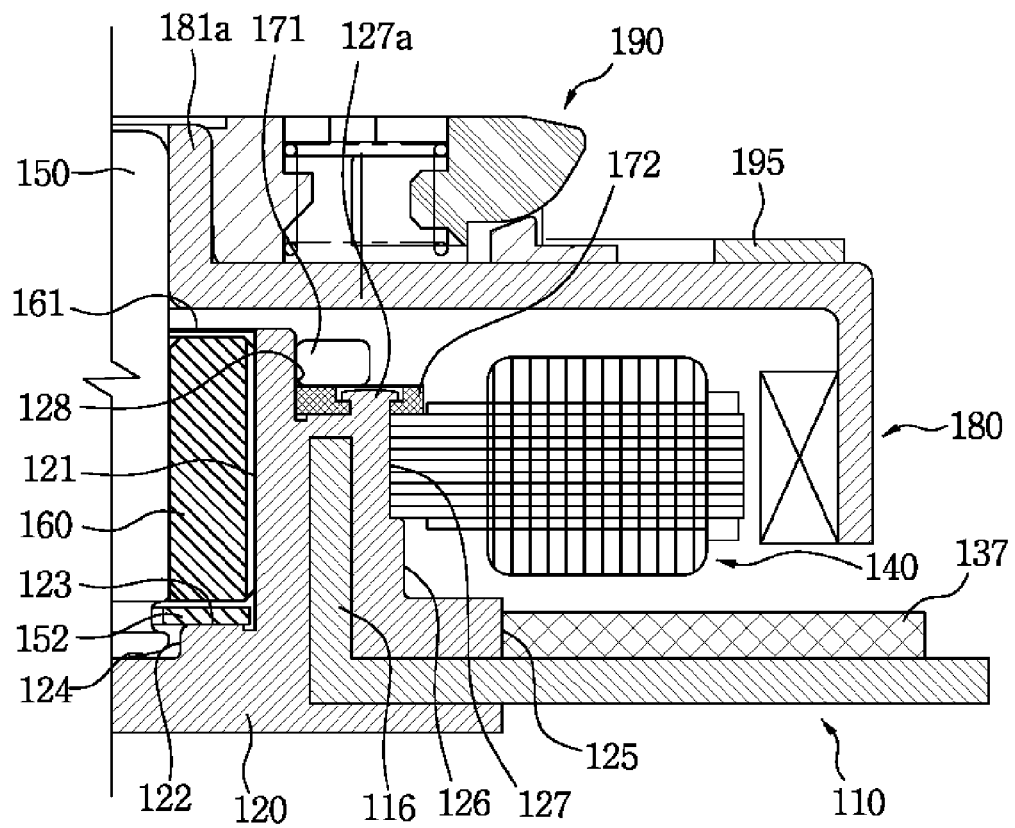
FIG. 10 is a cross-sectional view of an ultra-thin type spindle motor in the axial direction according to a third embodiment of the present invention.

The structures and actions of the remaining parts in the third embodiment shown in FIG. 10 are the same as those in the first embodiment, and a description thereof is omitted. Furthermore, the same parts as those of the first embodiment are assigned the same reference numerals.

In the first to the third embodiments and the sixth embodiment, the present invention is illustrated to be applied to the ultra-thin type spindle motor, but the present invention may also be applied to a half-height type spindle motor.

Figure 13:
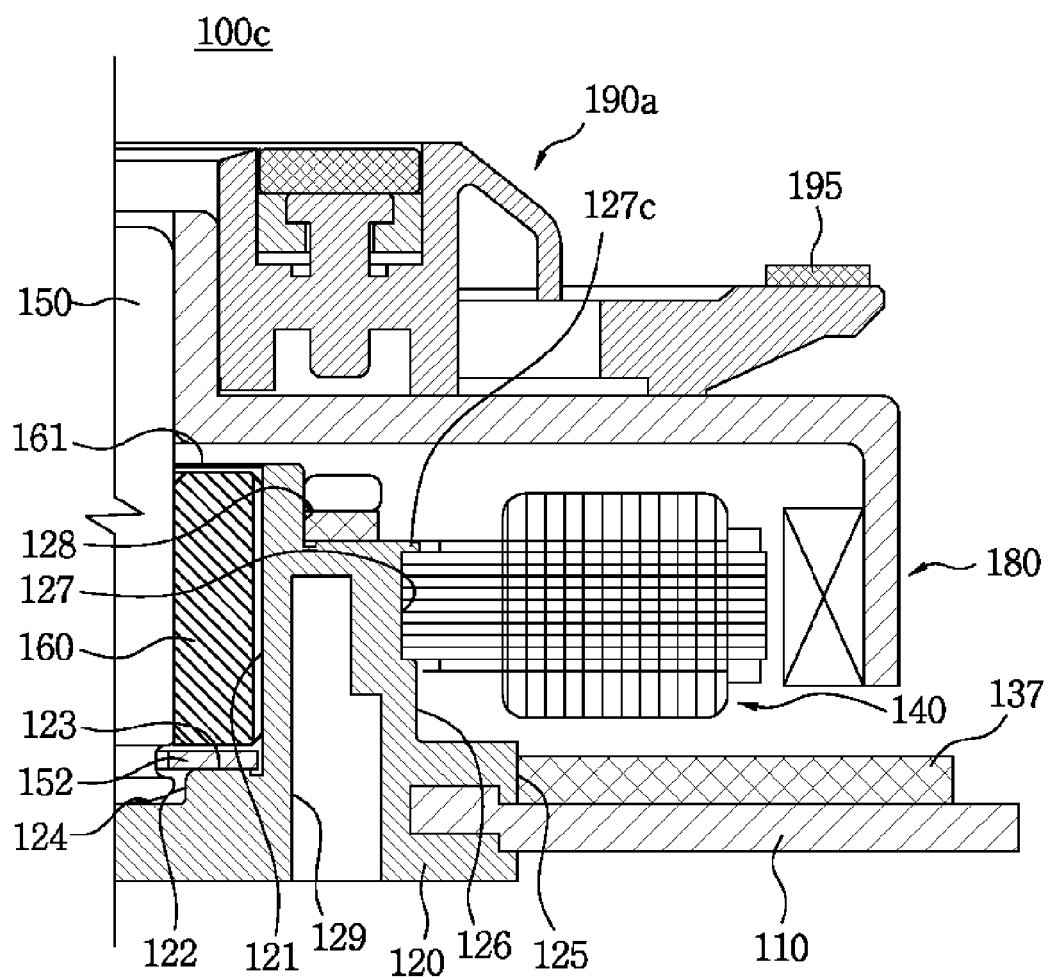
FIGS. 13 and 14 are cross-sectional views of half-height type spindle motors in the axial direction according to fourth and fifth embodiments of the present invention.
Figure 14:
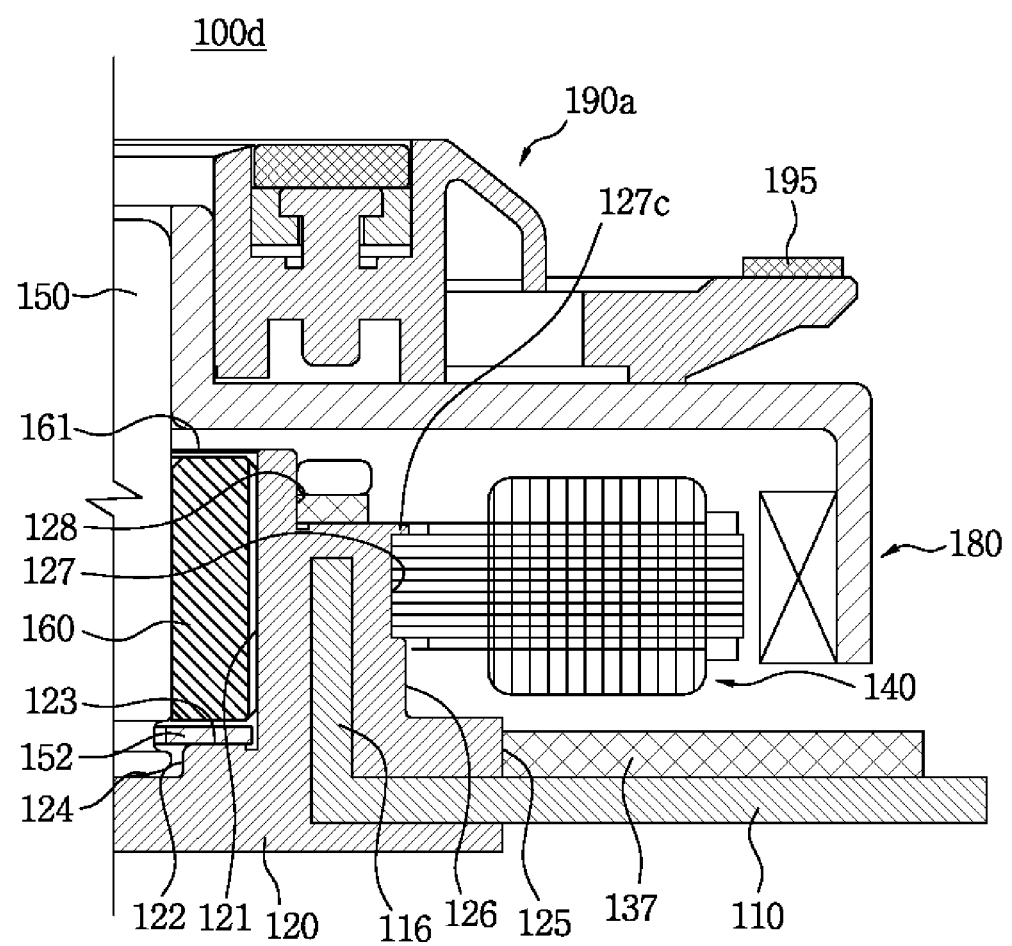

FIGS. 13 and 14 are cross-sectional views of half-height type spindle motors in the axial direction according to fourth and fifth embodiments of the present invention, respectively.

The spindle motor 100c according to the fourth embodiment shown in FIG. 13 has a similar structure to that of the first embodiment except that a half-height chucking device 190a is mounted on the rotor 180.

The spindle motor 100d of the rotor 180 according to the fifth embodiment shown in FIG. 14 is different from that of the fourth embodiment in that a half-height chucking device 190a is mounted on the top of the spindle motor 100d and the base plate 110, including the strength reinforcement extension portion 116 according to the third embodiment, is used.

The half-height chucking device 190a may have a known structure, and a detailed description thereof is omitted.

Meanwhile, in the spindle motors 100c and 100d according to the fourth and the fifth embodiments, a plurality of fixing protrusions 127c is upwardly formed from the step portion 128a between the third outer diameter portion 127 and the fourth outer diameter portion 128 of the bearing housing 120 at specific intervals.

If, when the stator 140 is fixed to the bearing housing 120, the stator 140 is fixed to the third outer diameter portion 127 of the bearing housing 120 and the vertically protruded fixing protrusions 127c are subjected to heat fusion and then bent to surround the top of the inner circumferential face of the stator 140, the assembly and fixing work of the stator 140 can be easily performed without using conventional adhesives.

Meanwhile, in the first to the sixth embodiments, when the bearing housing 120 is formed, the bearing housing 120 and the base plate 110 are subjected to insert molding or insert injection and metal material is used for the base plate 110. However, the base plate 110 and the bearing housing 120 may be integrally molded using the same resin, as shown in FIG. 16.

Figure 16:
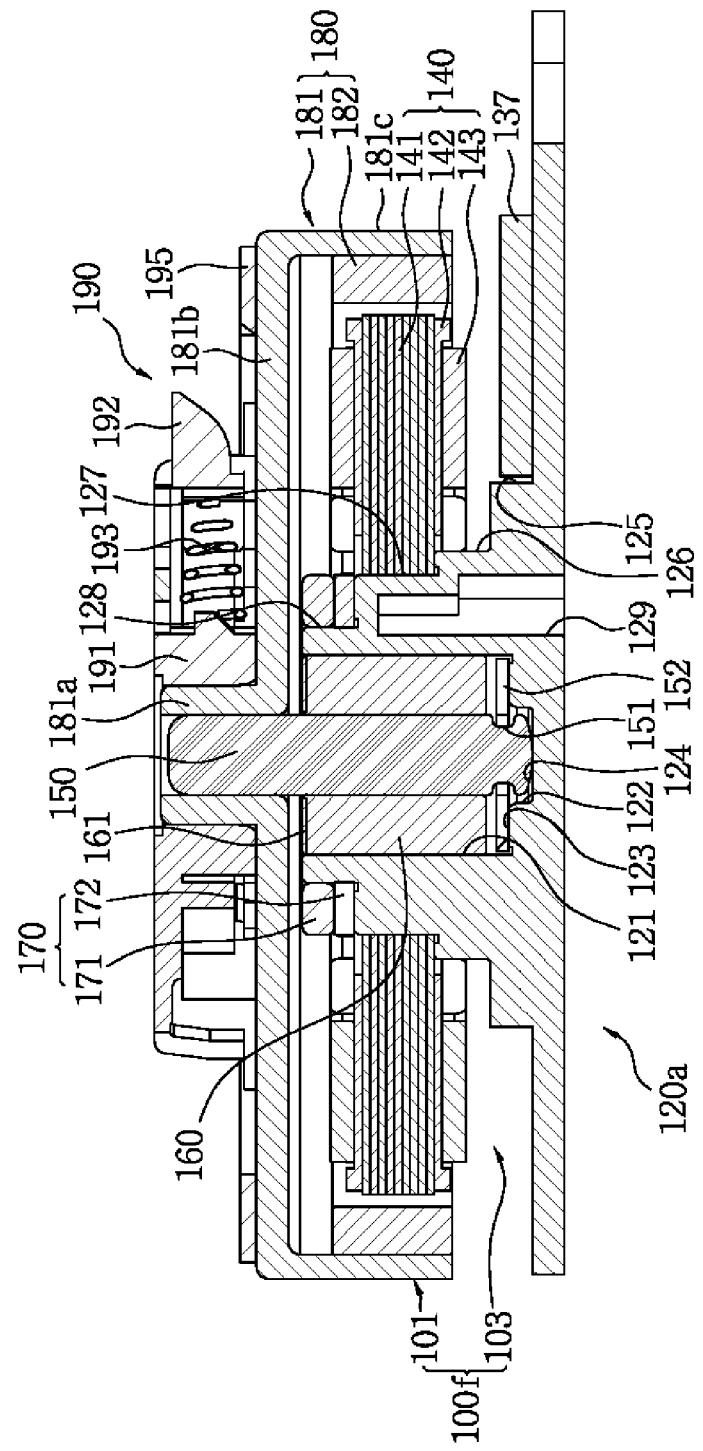
FIG. 16 is a cross-sectional view showing an ultra-thin type spindle motor in the axial direction according to a seventh embodiment of the present invention.

FIG. 16 is a cross-sectional view showing an ultra-thin type spindle motor in the axial direction according to a seventh embodiment of the present invention. The ultra-thin type spindle motor 100f according to the seventh embodiment is quite different from the first to the sixth embodiments in that the base plate and the bearing housing are integrally using the same resin material.

In the seventh embodiment of the present invention, the fixed body 103 is formed of a fixed body housing 120a in which the base plate and the bearing housing are integrally made of the same material by using the same method as those of the first to the sixth embodiments.

If, as described above, the bearing housing and the base plate are integrated to form the fixed body housing 120a using the same material, a portion downwardly protruded from the fixed body housing 120a can be removed. Accordingly, there are advantages in that a slimmer thickness can be achieved, the manufacturing process can be simplified, and the material cost can be reduced.

Furthermore, as in the seventh embodiment, when the base plate and the bearing housing are integrated to form the fixed body housing 120a using the same material, the number of parts can be reduced to one, and the support washer and the cap can be obviated, thus further reducing the number of parts. Accordingly, the assembly of parts can be improved, the manufacturing cost can be reduced, the verticality of the pivot can be improved, and vibration and noise can be reduced.

Furthermore, in the spindle motor of the present invention, the base plate and the bearing housing are integrated to form the fixed body housing 120a. Accordingly, a skew of the pivot or the bearing can be prevented, a more stable driving characteristic can be guaranteed, and the size and weight can be reduced.

The spindle motor according to the seventh embodiment is illustrated to have the ultra-thin chucking device, but may include not only the ultra-thin chucking device, but also a half-height chucking device in order to implement a disc drive device.

In the description of the above embodiments, the present invention has been described and shown to be applied to spindle motors requiring high-speed rotation, but the present invention may also be applied to not only the spindle motors requiring high-speed rotation, but also motors for low-speed rotation.

Furthermore, the motors shown in the embodiments of the present invention have been described by taking a brushless DC motor as an example, but the present invention may also be applied to a brush type DC motor.

As described above, in the motors according to the present invention, the bearing housing is made of resin and, at the same time when the bearing housing is made of resin, the base plate is integrated with the bearing housing a method, such as insert injection, heat fusion, or bonding. Accordingly, the verticality of the bearing and the pivot assembled with the bearing housing and the base plate can be secured, the manufacturing cost can be reduced, and the efficiency of a manufacturing process can be improved.

Furthermore, in the present invention, when the bearing housing is formed, the support washer and the cap are integrally formed using the same material. Accordingly, the number of assembly parts can be reduced, the verticality of the pivot can be improved, vibration and noise can be reduced, and the leakage of oil within the bearing can be prevented.

Furthermore, in the present invention, when the bearing housing is pressed to and assembled with the bearing, there is no change in the outer diameter portion of the bearing because the strength of the bearing is greater than the strength of the bearing housing. Accordingly, a sizing process is not required.

Furthermore, in the present invention, when the stator is fixed to the bearing housing, the stator can be assembled with the bearing housing at a constant position using the assembly guides provided on the outer circumferential portion of the bearing housing and, at the same time, the front end portions of the fixing protrusions are subjected to heat fusion or bonding. Accordingly, the assembly and fixing work of the stator can be easily performed without using conventional two-component type adhesives.

Meanwhile, in the present invention, the base plate and the bearing housing are integrated to form the fixed body housing the same material. Accordingly, the number of parts can be reduced to one, and the support washer and the cap can be removed to further reduce the number of parts. Consequently, the assembly of the parts can be improved, the manufacturing cost can be reduced, the verticality of the pivot can be improved, and vibration and noise can be reduced.

Furthermore, in the motor of the present invention, the base plate and the bearing housing are integrated to form the fixed body housing. Accordingly, a skew of the pivot or the bearing can be prevented, a more stable driving characteristic can be guaranteed, and the size and weight can be reduced. Furthermore, the motor of the present invention can implement a disc drive device using not only the ultra-thin chucking device, but also the half-height chucking device.

The present invention relates to a motor (in particular, a spindle motor) configured to include the rotor, the chucking device, the rotating body having the pivot connected to a central portion thereof, and the fixed body rotatably supporting the pivot of the rotating body and to have the bearing housing and the base plate integrated using an insert molding or insert injection method when the bearing housing of the fixed body is formed. Accordingly, the verticality of the bearing and the pivot can be secured, the manufacturing cost can be reduced, and the efficiency of an assembly process can be improved. In particular, the motor of the present invention can be applied to a disc driving device.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A motor, comprising:
   a rotor;
   a pivot configured to have one end connected to the rotor;
   a bearing configured to rotatably support an outer circumferential face of the pivot;
   a bearing housing made of resin and configured to comprise a first concave groove for receiving the bearing and a second concave groove for supporting the other end of the pivot; and
   a base plate having an inner lateral end integrated with an outer circumferential portion of the bearing housing by means of insert injection while the bearing housing is injected and molded using the resin,
   wherein a thrust magnet or the thrust magnet and a yoke for suppressing the rotor from rising in an axial direction when the rotor is rotated at high speed are connected to an outer diameter portion at a top of the bearing housing, and an inner circumferential portion of a stator is connected to the bearing housing and seated therein; and
   wherein the yoke is extended to compress and fix a top surface of the stator, having an outer circumferential portion mounted on the outer diameter portion of the bearing housing, and configured to comprise a plurality of through holes, and the bearing housing comprises a plurality of fixing protrusions extended to positions corresponding to the plurality of through holes of the yoke and configured to fix the yoke.

2. The motor as claimed in claim 1, wherein the bearing housing comprises at least one lose-weight space.

3. The motor as claimed in claim 1, wherein the base plate comprises:
   a flat plate portion configured to have a printed circuit board (PCB) mounted on a top surface thereof, the PCB being a driving circuit for supplying a driving signal to the stator, and
   an extension portion buried and molded in the bearing housing, extended from the flat plate portion in order to increase coherence with the bearing housing, and configured to have a through hole formed therein.

4. The motor as claimed in claim 3, further comprising a plurality of protrusion portions protruded in a central direction of the through hole of the extension portion.

5. The motor as claimed in claim 1, wherein the base plate comprises:
   a flat plate portion configured to have a printed circuit board (PCB) mounted on a top surface thereof and to have a through hole, the PCB being a driving circuit for supplying a driving signal to the stator, and
   a strength reinforcement extension portion upwardly extended from the through hole of the flat plate portion in such a way as to surround the first concave groove for receiving the bearing, thus increasing coherence with the bearing housing and reinforcing a strength of a boss portion surrounding the bearing.

6. The motor as claimed in claim 1, further comprising a slit washer installed in the first concave groove of the bearing housing and configured to prevent the pivot of the rotor from being separated from the bearing.

7. The motor as claimed in claim 1, wherein:
   the bearing housing has at least one assembly guide integrally formed in an outer diameter portion thereof connected to the stator, and
   the stator connected to the bearing housing has at least one assembly concave groove, corresponding to the assembly guide, formed in an inner circumferential portion thereof.

8. The motor as claimed in claim 1, wherein:
   the rotor is connected to the stator in an outer rotor manner, and
   the rotor comprises a chucking device disposed on a rotor casing and configured to fix a disc.

* * * * *